(12) United States Patent
Hanssen et al.

(10) Patent No.: US 7,660,077 B2
(45) Date of Patent: Feb. 9, 2010

(54) METHOD AND SYSTEM FOR REDUCTION OF OFF-TRACK WRITE ERRORS IN DISK DRIVES

(75) Inventors: Steven Hanssen, San Jose, CA (US); Masaki Kohno, San Jose, CA (US); Masakazu Sasaki, Yamato (JP); Jr-Yi Shen, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 450 days.

(21) Appl. No.: 11/329,679

(22) Filed: Jan. 10, 2006

(65) Prior Publication Data

US 2007/0159716 A1    Jul. 12, 2007

(51) Int. Cl.
    G11B 33/14   (2006.01)
    G11B 21/02   (2006.01)
(52) U.S. Cl. ............... 360/264.8; 360/264.9; 360/97.02
(58) Field of Classification Search ............... 360/266.7, 360/266.4, 266.8, 264.7, 264.8, 264.9, 97.01, 360/97.02
    See application file for complete search history.

(56) References Cited

U.S. PATENT DOCUMENTS

| 4,200,894 A | 4/1980 | Kaseta et al. |
| 4,530,021 A | 7/1985 | Cameron |
| 5,051,855 A | 9/1991 | Ghose et al. |
| 5,355,268 A | 10/1994 | Schulze |
| 5,483,400 A * | 1/1996 | Tsujino .................... 360/264.8 |
| 5,486,965 A * | 1/1996 | Yoshida et al. .............. 360/265 |
| 5,862,020 A | 1/1999 | Lee |
| 5,914,836 A * | 6/1999 | Pottebaum ............... 360/264.8 |
| 6,088,176 A | 7/2000 | Smith et al. |
| 6,353,517 B1 | 3/2002 | Okunaga et al. |
| 6,515,812 B1 | 2/2003 | Bergmans et al. |
| 6,775,105 B2 | 8/2004 | Hong et al. |
| 2002/0034053 A1 * | 3/2002 | Okunaga et al. ......... 360/264.7 |
| 2004/0105190 A1 | 6/2004 | Kim et al. |

FOREIGN PATENT DOCUMENTS

| EP | 721181 A2 * | 7/1996 |
| JP | 01039668 A * | 2/1989 |
| JP | 01073572 A * | 3/1989 |
| JP | 08167259 A * | 6/1996 |
| JP | 09213029 A * | 8/1997 |
| JP | 2000149396 A * | 5/2000 |

* cited by examiner

*Primary Examiner*—William J Klimowicz

(57) ABSTRACT

In an embodiment of the present invention, at least one mechanical fastener is used to mount a voice coil magnet assembly of a hard disk drive on a housing of the hard disk drive. A layer of a material having a low friction coefficient is disposed between the housing and the voice coil magnet assembly.

8 Claims, 7 Drawing Sheets

400

600

START

USING AT LEAST ONE FASTENER TO MOUNT A VOICE COIL MAGNET ASSEMBLY OF A HARD DISK DRIVE ON A HOUSING OF THE HARD DISK DRIVE.
610

DISPOSING A LAYER OF A MATERIAL HAVING A LOW FRICTION COEFFICIENT BETWEEN THE HOUSING AND THE VOICE COIL MAGNET ASSEMBLY.
620

END

METHOD AND SYSTEM FOR REDUCTION OF OFF-TRACK WRITE ERRORS IN DISK DRIVES

FIELD OF THE INVENTION

Embodiments of the present invention are related to measurement of contact potential voltages between a slider body and a disk surface of a hard disk drive. Embodiments of the present invention are also related to measurement of clearance of the slider body above the surface of the hard disk drive.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a substantially constant rotational speed. An actuator arm or slider is utilized to reach out over the disk. The arm has a head-gimbal-assembly (HGA) composed of a suspension, flexure and a slider carrying the read/write components.

In operation, the hard disk is rotated at a set speed via a spindle motor assembly having a central drive hub. Additionally, there are tracks evenly spaced at known intervals across the disk. When a request for a read of a specific portion or track is received, the actuator and servo-system of the hard drive aligns the head, via the arm, over the specific track location and the head reads the information from the disk. In the same manner, when a request for a write of a specific portion or track is received, the hard disk aligns the head, via the arm, over the specific track location and the head writes the information to the disk.

One phenomenon, known as "stick slip," may occur in hard disk drives which can cause a significant displacement of the actuator arm. This phenomenon is particularly problematic when the hard disk drive is exposed to a thermal gradient. The thermal gradient may be the result of, for example, a hard disk drive in a laptop computer being moved from a colder environment into a warmer environment. Alternatively, a hard disk drive in computer which has been turned off for an extended period may experience a significant thermal gradient when the computer is turned on again.

FIG. 1 is a cross section view showing an exemplary voice coil magnet assembly 101 mounted on a housing 102 of a hard disk drive. As the hard disk drive begins to warm up, the voice coil magnet assembly 101 and housing 102 expand at different rates in accordance with the thermal coefficients of the materials of which they are made. Because the components are tightly coupled during the fabrication process by screw 103, movement of voice coil magnet assembly 101 relative to housing 102 is constrained due to friction caused by the clamping force applied by screw 103. Thus, stress builds where voice coil magnet assembly 101 is in contact with housing 102. As the two components continue to expand at different rates, the stress becomes greater than the friction between the components and the stick slip event occurs in a manner similar to an earthquake relieving pressure between two tectonic plates.

This is shown in FIG. 2 which shows the outputs of accelerometers which were disposed on a hard disk drive which was exposed to a thermal gradient. At a plurality of events (e.g., 201, 202, 203, and 204) the relief of stress between voice coil magnet assembly 101 and housing 102 (e.g., a stick slip event) is of sufficient magnitude to be detected by the accelerometers.

When a stick slip event occurs between voice coil magnet assembly 101 and housing 102, the actuator arm may be displaced enough to exceed the limits of the position error signal (PES) parameters for the hard disk drive. Typically when this occurs, further writing to the hard disk is inhibited by the servo mechanism of the hard disk drive, or an off-track write error. Alternatively, the actuator arm may be displaced to an entirely different data track. When this occurs, writing to the disk may continue until an off-track write error is recorded. When this happens, writing to the hard disk is suspended, the actuator arm is re-positioned over the correct data track, and writing to the hard disk is resumed. However, until the writing to the hard disk is stopped, previously saved data may be overwritten.

SUMMARY OF THE INVENTION

In an embodiment of the present invention, at least one mechanical fastener is used to mount a voice coil magnet assembly of a hard disk drive on a housing of the hard disk drive. A layer of a material having a low friction coefficient is disposed between the housing and the voice coil magnet assembly to facilitate movement of the voice coil magnet assembly relative to the housing.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 6 is a flowchart of a method for reducing off-track write errors in a hard disk drive in accordance with embodiments of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
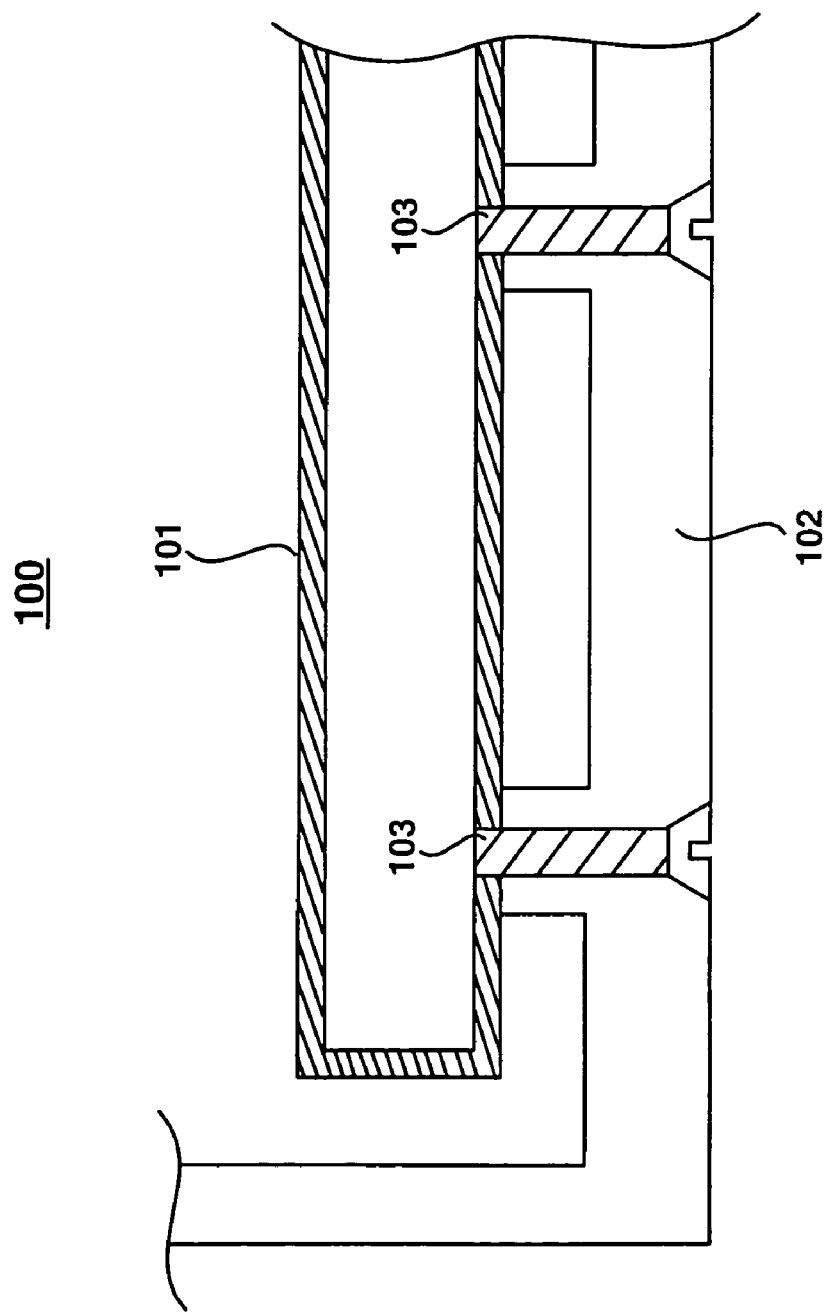
FIG. 1 is a cross section view showing an exemplary voice coil magnet assembly mounted on a housing of a hard disk drive.
Figure 2:
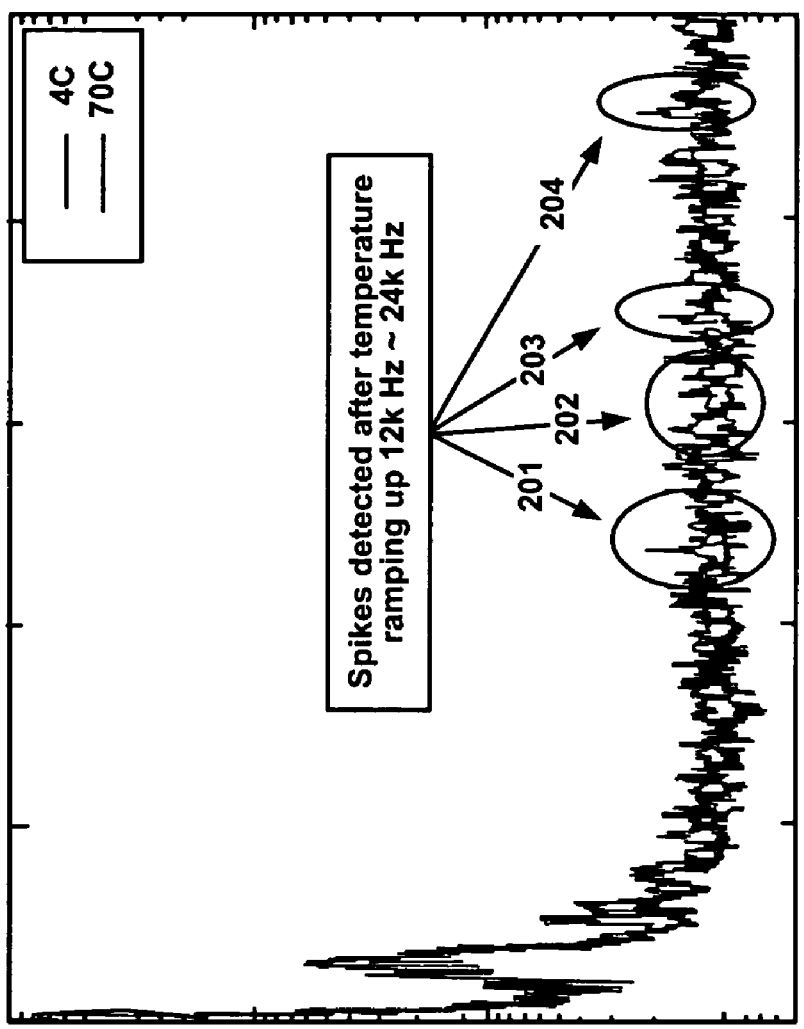
FIG. 2 is a graph showing stick slip of a hard disk drive housing after being exposed to a thermal gradient.
Figure 3:
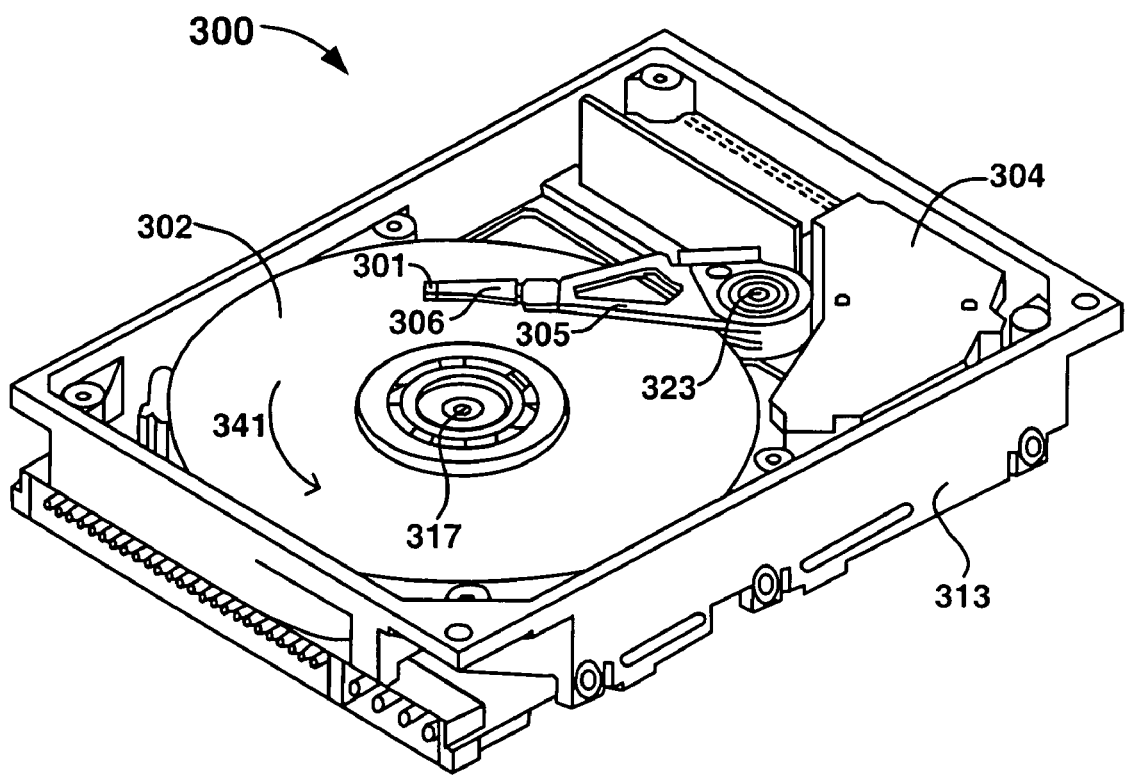
FIG. 3 shows a hard disk drive in accordance with embodiments of the present invention.

With reference now to FIG. 3, a schematic drawing of one embodiment of a magnetic hard disk file or drive 300 for a computer system is shown. Drive 300 has a lower housing or base 313 containing a disk pack having at least one media or magnetic disk 302. It is noted that an upper housing (not shown) is typically coupled with housing 313 during normal operation of hard disk drive 300. The disk or disks 302 are rotated (see arrows 341) by a spindle motor assembly having a central drive hub 317. An actuator comprising a plurality of parallel actuator arms 305 (one shown) in the form of a comb that is movably or pivotally mounted to base 313 about a pivot assembly 323. A controller (not shown) is also mounted to base 313 for selectively moving the comb of arms 305 relative to disk 302.

In the embodiment shown, each arm 305 has extending from it at least one cantilevered load beam and suspension 306. A magnetic read/write transducer or head is mounted on a slider 301 and secured to a flexure that is flexibly mounted to each suspension 306. The read/write heads magnetically read data from and/or magnetically write data to disk 302. The level of integration called the head gimbal assembly (HGA) is head and the slider 301, which are mounted on suspension 306. The slider 301 is usually bonded to the end of suspension 306. The head is typically pico size (approximately 1245×1000×300 microns) and formed from ceramic or intermetallic materials. The head also may be of "femto" size (approximately 850×700×230 microns) and is pre-loaded against the surface of disk 302 (in the range two to ten grams) by suspension 306.

Suspensions 306 have a spring-like quality, which biases or urges the air-bearing surface of the slider 301 against the disk 302 to cause the slider 301 to fly at a precise distance from the disk. A voice coil magnet assembly 304 is mounted to a lower housing 313 and is also mounted to arms 305 opposite the head gimbal assemblies. Movement of the voice coil magnet assembly 304 by the controller moves the head gimbal assemblies along radial arcs across tracks on the disk 302 until the read/write transducer is positioned above the desired data track. The head gimbal assemblies operate in a conventional manner and typically move in unison with one another, unless drive 300 uses multiple independent actuators (not shown) wherein the arms can move independently of one another.

Figure 4:
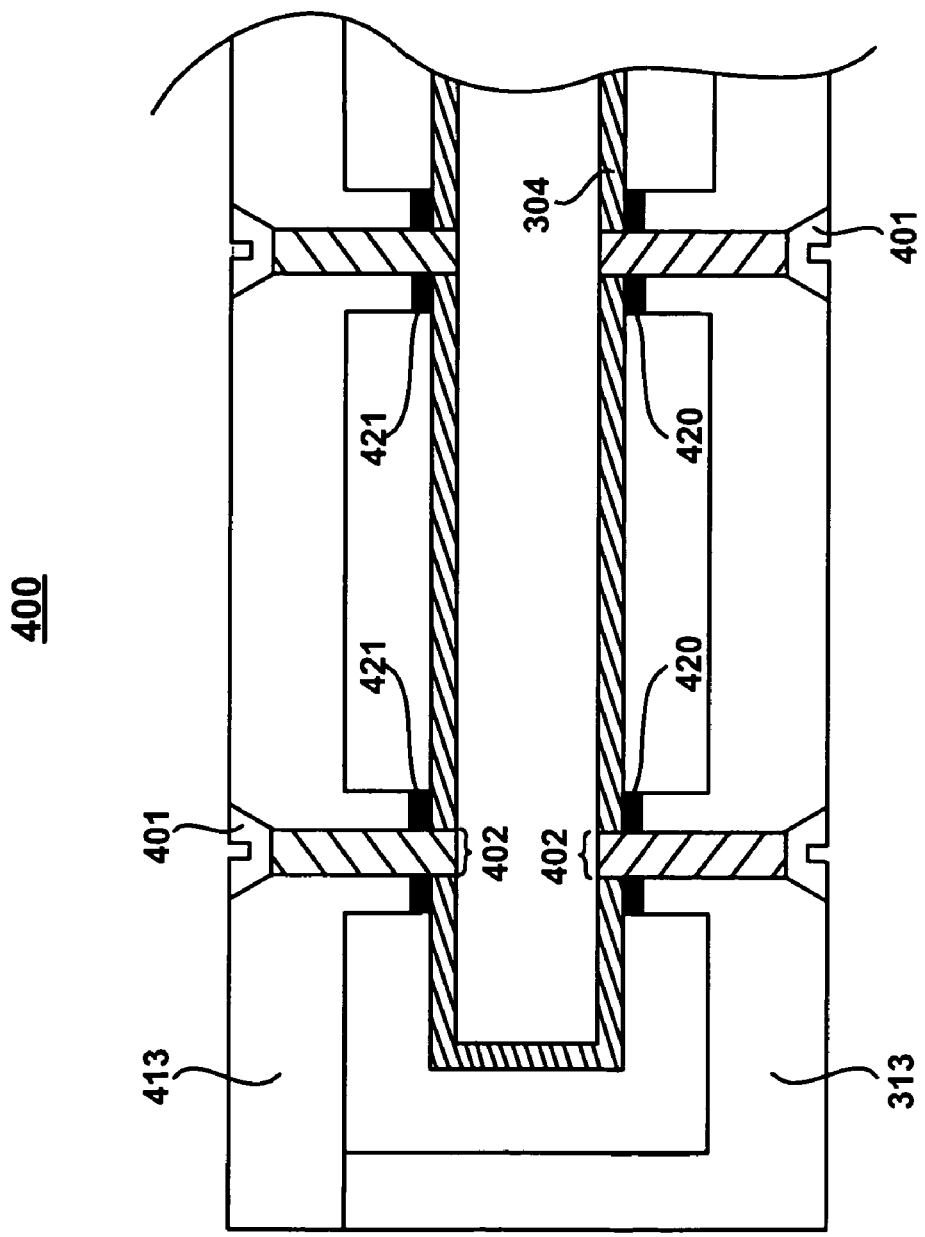
FIG. 4 is a cross section view of a voice coil magnet assembly mounted on a hard disk drive in accordance with embodiments of the present invention.

FIG. 4 is a cross section view of a voice coil magnet assembly mounted on a hard disk drive 400 in accordance with embodiments of the present invention. In the embodiment of FIG. 4, voice coil magnet assembly 304 is coupled with lower housing 313 using fasteners 401. Additionally, voice coil magnet assembly 304 is similarly coupled with upper housing 413. In embodiments of the present invention, fasteners 401 comprise screws, pins, or another fastening device which is used to couple voice coil magnet assembly 304 in a substantially fixed manner relative to lower housing 313. In FIG. 4, fasteners 401 extend into features 402 of voice coil magnet assembly 304 (e.g., threaded holes). In the embodiment of FIG. 4, a layer 420 of a material is disposed between lower housing 313 and voice coil magnet assembly 304, thus preventing direct contact between those components. A second layer 421 is disposed between voice coil magnet assembly 304 and upper housing 413.

In embodiments of the present invention, layers 420 and 421 comprise a material having a low friction coefficient. In embodiments of the present invention, layers 420 and 421 facilitate movement of voice coil magnet assembly 304 relative to lower housing 313 and upper housing 413 due to, for example, thermal expansion of those components. More specifically, lower housing 313 and upper housing 413, are typically made of aluminum while the outer portions of voice coil magnet assembly 304 are typically made of a ferrous metal (e.g., steel, or nickel plated iron). As a result, voice coil magnet assembly 304, lower housing 313, and upper housing 413 typically have different thermal expansion coefficients.

As discussed above, when exposed to a thermal gradient, these components will expand/contract at different rates. The clamping force applied by fasteners 401 increases the friction between voice coil magnet assembly 304, lower housing 313, and upper housing 413 and thus the movement of these components which would normally occur is constrained. As they continue to expand/contract, the strain between these components overcomes the clamping force applied by fasteners 401 and is suddenly released in a stick slip event.

Returning to FIG. 4, layers 420 and 421 reduce the friction between voice coil magnet assembly 304, lower housing 313, and upper housing 413. In other words, layers 420 and 421 permit the voice coil magnet assembly 304, lower housing 313, and upper housing 413 to expand/contract past each other more readily. Thus, when exposed to a thermal gradient, they can more readily expand or contract without causing a stick slip event from occurring. In so doing, off-track write errors and/or position error signal is reduced in embodiments of the present invention.

In embodiments of the present invention, movement of voice coil magnet assembly 304 relative to lower housing 313 and/or upper housing 413 is further facilitated by reducing the clamping force applied by fasteners 401. For example, the torque applied to fasteners 401 when coupling lower housing 313 and/or upper housing 413 with voice coil magnet assembly 304 is reduced to further facilitate expansion/contraction between these components when exposed to a thermal gradient. This is counter-intuitive to conventional manufacturing processes in which unwanted movement between components is typically resolved by further constraining movement (e.g., by increasing the clamping force applied by fasteners 401).

Figure 5A:
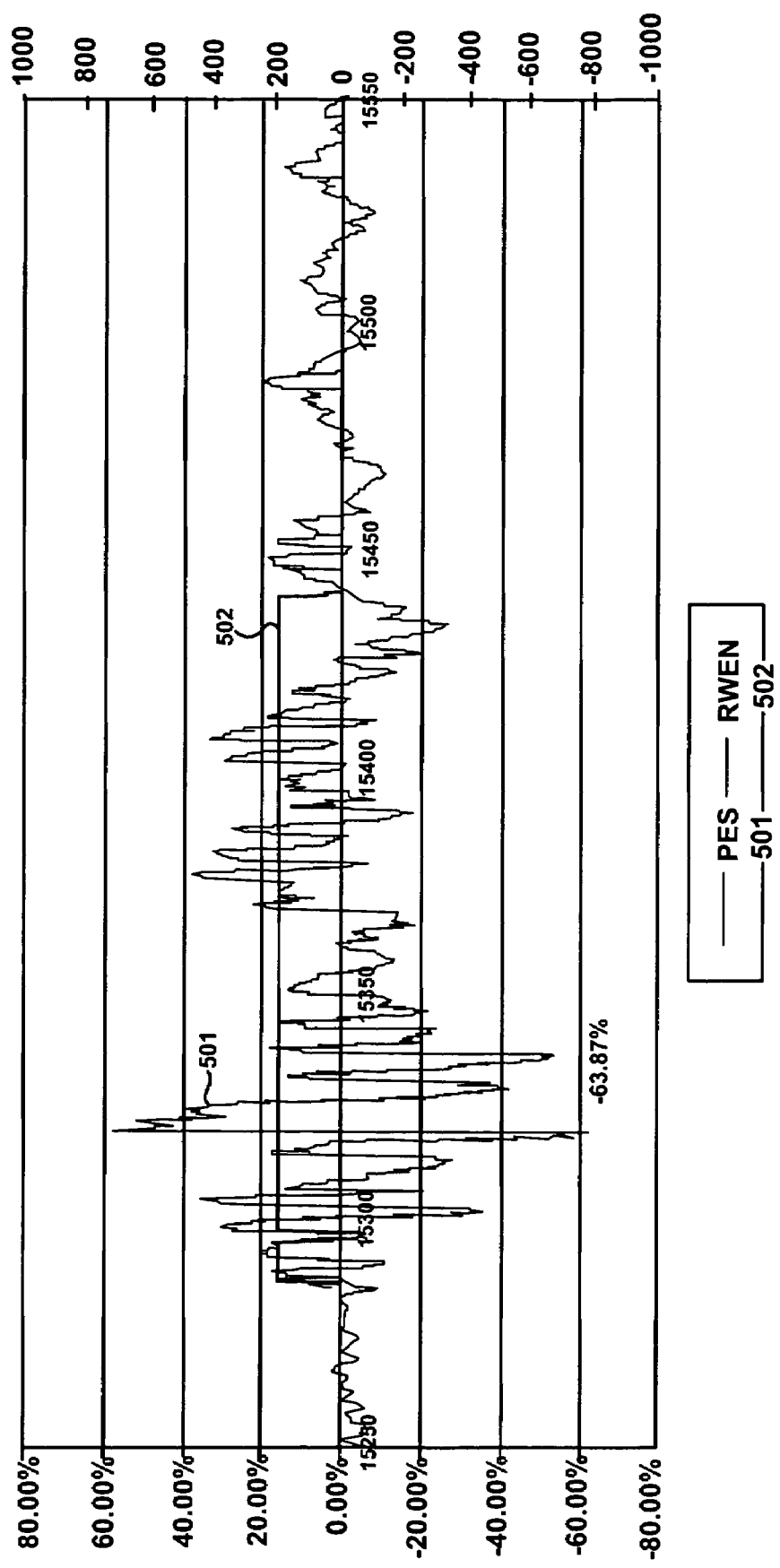
FIG. 5A shows a position error signal and a write inhibit signal based thereon in a conventional hard disk drive.

FIG. 5A shows a position error signal and a write inhibit signal based thereon in a conventional hard disk drive. In FIG. 5A, the position error signal (PES) 501 is shown as a jagged line which indicates the percentage of deviation in the positioning of the magnetic head relative to a data track of a conventional hard disk drive due to exposure to a thermal gradient. Write inhibit signal (RWEN) 502 is a signal which prevents writing to the hard disk when PES signal 501 exceeds or approaches an error of 15% or greater.

Figure 5B:
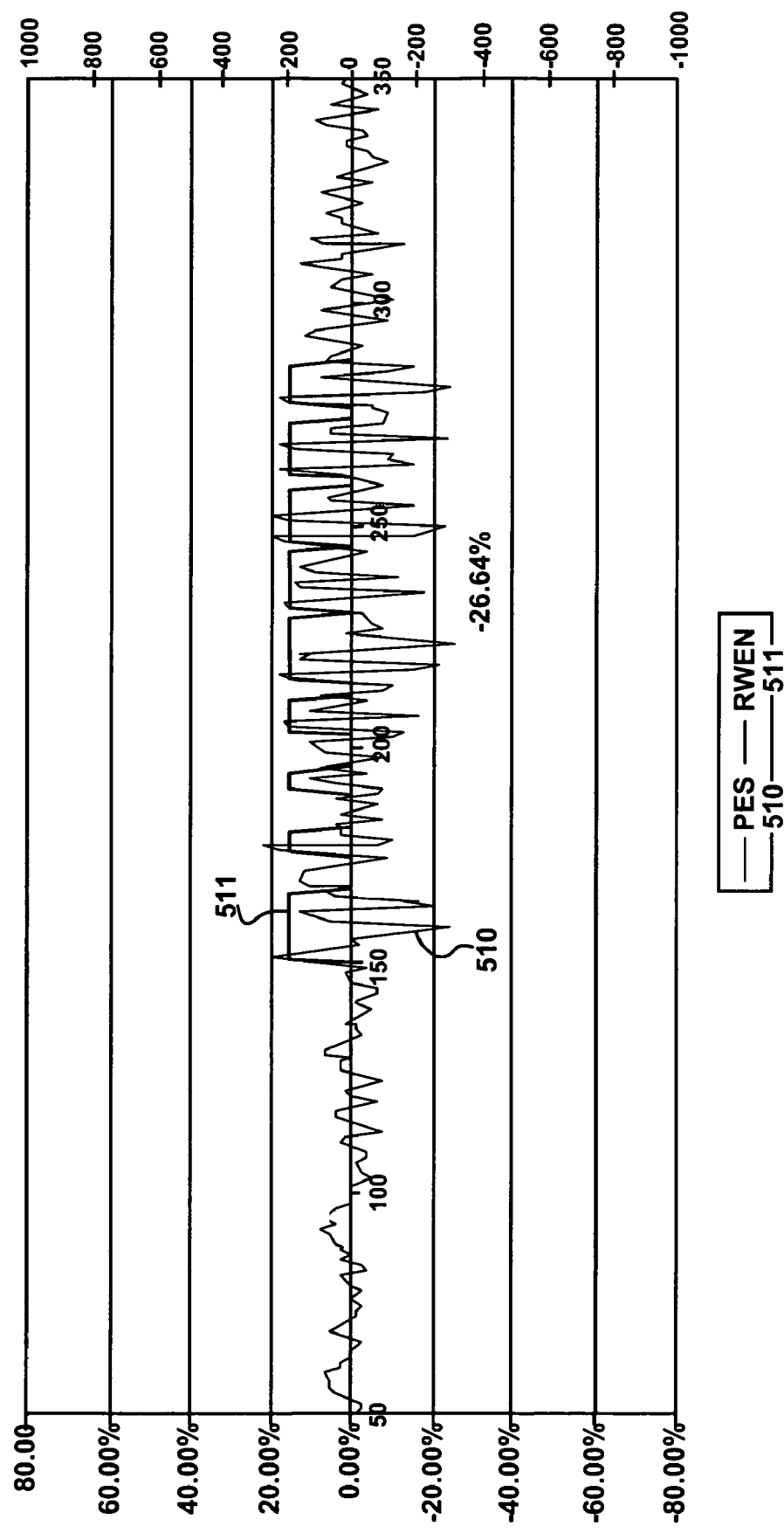
FIG. 5B shows a position error signal and a write inhibit signal based thereon in accordance with embodiments of the present invention.

FIG. 5B shows a position error signal and a write inhibit signal based thereon in accordance with embodiments of the present invention. In FIG. 5B, the position error signal (PES) 510 is shown as a jagged line which indicates the percentage of deviation in the positioning of the magnetic head relative to a data track of hard disk drive 300 due to exposure to a thermal gradient. Write inhibit signal (RWEN) 511 is a signal which prevents writing to the hard disk when PES signal 510 exceeds or approaches an error of 15% or greater. As shown in FIG. 5B, the magnitude of the position error signal (e.g., 510) is greatly reduced in embodiments of the present invention. As a result, the generation of write inhibit signal (e.g., RWEN) 511 occurs over shorter durations, and over a shorter total duration, than is exhibited in conventional hard disk drives.

FIG. 6 is a flowchart of a method for reducing off-track write errors in a hard disk drive in accordance with embodiments of the present invention. In step 610 of FIG. 6, at least one fastener is used to mount a voice coil magnet assembly of a hard disk drive on a housing of the hard disk drive. As discussed above with reference to FIG. 4, fasteners 401 are used to couple voice coil magnet assembly 304 with lower housing 313 and/or upper housing 413.

In step 620 of FIG. 6, a layer of a material having a low friction coefficient is disposed between the housing and the voice coil magnet assembly of the hard disk drive. Again referring to FIG. 4, layers 420 and 421 are disposed between voice coil magnet assembly 304 and lower housing 313 and upper housing 413 respectively. In embodiments of the present invention, layers 420 and 421 comprise a material having a low friction coefficient. This reduces the amount of stress that can build between these components due to constraints on their relative motion under thermal gradients. By reducing the amount of stress that can accumulate, the stress can be relieved in smaller increments than was realized in conventional hard disk drives, thus reducing position error signals and/or off-track write errors.

The preferred embodiment of the present invention, a method and system for reducing off-track write errors in disk drives, is thus described. While the present invention has been described in particular embodiments, it should be appreciated that the present invention should not be construed as limited by such embodiments, but rather construed according to the following claims.

What is claimed is:

1. A method for reducing off-track write errors in a hard disk drive, said method comprising:
   using at least one fastener to mount a voice coil magnet assembly of said hard disk drive, on a housing of said hard disk drive in a manner which prevents rotation of said voice coil magnet assembly relative to said housing; and
   disposing a layer of a material having a low friction coefficient between said housing and said voice coil magnet assembly wherein said layer of material is in contact with said at least one fastener at a location where said at least one fastener couples said voice coil magnet assembly with said housing.

2. The method as recited in claim 1 wherein said housing comprises an upper housing and a lower housing and wherein said method further comprises:
   disposing said layer between said voice coil magnet assembly and said lower housing at said location where said at least one fastener couples said voice coil magnet assembly with said lower housing; and
   disposing a second layer of said material between said voice coil magnet assembly and said upper housing at a second location where a second fastener couples said voice coil magnet assembly with said upper housing.

3. The method as recited in claim 1 further comprising:
   depositing said layer proximate to a feature of said voice coil magnet assembly for coupling with said mechanical fastener.

4. The method as recited in claim 1 further comprising:
   reducing the friction coefficient between said voice coil magnet assembly and said housing by reducing the clamping force applied by said fastener.

5. A system for reducing off-track write errors in a hard disk drive comprising:
   a housing;
   a disk pack mounted to said housing and comprising at least one hard disk that is rotatable relative to said housing, the disk pack defining an axis of rotation and a radial direction relative to the axis;
   a voice coil magnet assembly mounted to said housing in a manner which prevents movement of said voice coil magnet assembly relative to said housing using at least one fastener; and
   a layer of a material having a low friction coefficient disposed between said voice coil magnet assembly and said housing wherein said layer of material is in contact with said at least one fastener at a location where said fastener couples said voice coil magnet assembly with said housing.

6. The system of claim 5 wherein said housing comprises an upper housing and a lower housing and wherein said layer is disposed between said voice coil magnet assembly and said lower housing at a location where said fastener couples said voice coil magnet assembly with said lower housing and a second layer of said material is disposed between said voice coil magnet assembly and said upper housing at a second location where a second fastener couples said voice coil magnet assembly with said upper housing.

7. The system of claim 6 wherein said layer is deposited proximate to a feature of said voice coil magnet assembly for coupling with said fastener.

8. The system of claim 6 wherein the friction coefficient between said voice coil magnet assembly and said housing is reduced by reducing the clamping force applied by said fastener.

* * * * *

UNITED STATES PATENT AND TRADEMARK OFFICE
CERTIFICATE OF CORRECTION

PATENT NO. : 7,660,077 B2
APPLICATION NO. : 11/329679
DATED : February 9, 2010
INVENTOR(S) : Steven A. Hanssen et al.

It is certified that error appears in the above-identified patent and that said Letters Patent is hereby corrected as shown below:

Column 6, Claim 3, Line 11: delete "mechanical"
           and insert -- at least one --

Signed and Sealed this

Fifth Day of October, 2010

David J. Kappos
*Director of the United States Patent and Trademark Office*